(12) United States Patent
Koch

(10) Patent No.: US 7,571,602 B2
(45) Date of Patent: Aug. 11, 2009

(54) EXHAUST AFTERTREATMENT SYSTEM AND METHOD OF USE FOR LEAN BURN INTERNAL COMBUSTION ENGINES

(75) Inventor: Calvin K. Koch, Huntington Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 36 days.

(21) Appl. No.: 11/416,911

(22) Filed: May 3, 2006

(65) Prior Publication Data

US 2006/0260297 A1    Nov. 23, 2006

Related U.S. Application Data

(60) Provisional application No. 60/682,750, filed on May 19, 2005.

(51) Int. Cl.
*F01N 3/00* (2006.01)
(52) U.S. Cl. ............................. 60/286; 60/274; 60/287; 60/292; 60/295; 60/297; 60/303; 48/197 R; 48/198.7
(58) Field of Classification Search .................. 60/274, 60/286, 287, 291, 292, 293, 295, 297, 303, 60/324, 288, 289; 48/197 R, 198.7
See application file for complete search history.

(56) References Cited

U.S. PATENT DOCUMENTS

| | | | |
|---|---|---|---|
| 6,832,473 B2 * | 12/2004 | Kupe et al. | 60/286 |
| 6,976,353 B2 * | 12/2005 | Daniel et al. | 60/275 |
| 7,063,642 B1 * | 6/2006 | Hu et al. | 477/100 |
| 7,213,395 B2 * | 5/2007 | Hu et al. | 60/286 |
| 7,240,483 B2 * | 7/2007 | Cizeron et al. | 60/286 |
| 2005/0072140 A1 | 4/2005 | Taylor et al. | |
| 2005/0091967 A1 | 5/2005 | Sisken | |
| 2005/0091969 A1 | 5/2005 | Van Nieuwstadt et al. | |

OTHER PUBLICATIONS

International Search Report for PCT/US06/17017 mailed Jul. 24, 2007 and corresponding the to subject application.

* cited by examiner

*Primary Examiner*—Binh Q Tran
(74) *Attorney, Agent, or Firm*—Quinn Law Group, PLLC

(57) ABSTRACT

The present invention is an aftertreatment system for lean burn internal combustion engines. The present invention provides a multiple branch lean NOx trap, or LNT, with a diverter valve operable to selectively direct lean exhaust flow to one portion of the LNT while another portion of the LNT regenerates in a low oxygen environment. Additionally, the present invention employees a continuously operating side stream exhaust fuel reformer that delivers a reductant, such as partially oxidized (POx) gas or reformate, to the LNT for regeneration. The present invention also provides a method of exhaust aftertreatment of a lean burn internal combustion engine utilizing the system provided.

4 Claims, 2 Drawing Sheets

EXHAUST AFTERTREATMENT SYSTEM AND METHOD OF USE FOR LEAN BURN INTERNAL COMBUSTION ENGINES

CROSS-REFERENCE TO RELATED APPLICATIONS

This application claims the benefit of U.S. Provisional Application 60/682,750, filed May 19, 2005, and which is hereby incorporated by reference in its entirety.

TECHNICAL FIELD

The present invention relates to an exhaust aftertreatment system for lean burn internal combustion engines.

BACKGROUND OF THE INVENTION

Lean burn compression ignited internal combustion engine technology, such as diesel, has the capability to provide improvements in fuel efficiency over a spark ignited internal combustion engine. However, new exhaust aftertreatment systems may be required to meet future oxides of nitrogen (NOx) and particulate emission standards.

One such system is the selective catalyst reduction (SCR) technology, such as hydrocarbon-SCR and urea-SCR. Hydrocarbon-SCR technology relies on hydrocarbons to selectively reduce the NOx in a lean, i.e. oxygen rich, environment with a specialized catalyst. Urea-SCR technology injects an aqueous urea solution into the exhaust stream, which then decomposes to ammonia that operates to reduce NOx over a catalyst. The urea-SCR technology requires periodic refilling of an on-board urea tank.

Another system is the lean NOx trap, or LNT. The LNT is an aftertreatment technology that employs catalyst devices, which include oxides of alkaline metals such as barium and cerium. The LNT catalytically oxidizes nitric oxide (NO) to nitrogen dioxide ($NO_2$), which is then stored in an adjacent chemical trapping site as nitrate ($NO_3$). The conversion efficiency of the LNT has been demonstrated to exceed 90%.

Once a quantity of NOx is absorbed by the LNT, a regeneration process is required to chemically reduce the nitrate to nitrogen to allow the LNT to trap or absorb additional NOx molecules. The conventional approach to regenerating the catalyst of an LNT is to temporarily introduce reducing agents such as hydrogen, carbon monoxide (CO), and hydrocarbons (HC) to the LNT. The reducing agents are often formed by operating the lean burn internal combustion engine at rich air/fuel (A/F) ratios. However, the products of rich combustion are not efficient reducing agents and as a result, the LNT catalyst must be over-regenerated, i.e. supplied with a large amount of reducing agents, to achieve high NOx conversion.

Hydrogen is an effective reducing agent to regenerate accumulated NOx within the LNT. There are several potential methods for supplying hydrogen on-board a vehicle to regenerate the LNT. One method would be to refuel a hydrogen storage tank from an external refueling station. A second method would be to equip the vehicle with an onboard reformer to convert fuel into hydrogen and carbon monoxide. This approach delivers a gas mixture of hydrogen, carbon monoxide, and nitrogen. The presence of carbon monoxide may inhibit the regeneration reaction at low temperatures, i.e. below 250° C.

With a typical LNT, having a Barium/Potassium formulation, the NOx reduction reaction proceeds within a temperature window of about 150° C. to 500° C. and NOx is desorbed without reduction above 600° C., when using hydrogen as the reductant. Furthermore, a desulfation step is required to maintain NOx absorber efficiency when operating the lean burn internal combustion engine with fuel containing an amount of sulfur. The desulfation step requires exhaust gas temperatures, at the LNT, greater than 600° C. for several minutes.

Also of concern is the reduction of particulate matter emissions from the lean burn internal combustion engine. Particulate matter emission is filtered from the exhaust stream by a device known as a diesel particulate filter, or DPF. The DPF typically filters the exhaust stream via wall-flow filtering. The DPF requires a regeneration step to maintain high filtering efficiency and to decrease associated exhaust backpressure on the engine. The regeneration process of the DPF requires temperatures greater than 600° C. in lean (oxygen rich) exhaust operable to burn the particulate matter trapped within the DPF. An alternative option to the DPF is the diesel particulate NOx filter, or DPNF, which is a catalytic combination of an LNT and a DPF. The DPNF utilizes NOx to continuously oxidize particulate matter from the filter.

SUMMARY OF THE INVENTION

An exhaust aftertreatment system for a lean burn internal combustion engine is provided. The exhaust aftertreatment system includes at least one lean NOx trap (LNT) and a mechanism operable to selectively and substantially shield a portion of the at least one LNT from an exhaust gas stream. The exhaust aftertreatment system may further include a reformer operable to provide reformate to the portion of the at least one LNT to allow regeneration of the at least a portion of the at least one LNT to occur.

A diesel oxidation catalyst may be disposed in upstream and/or downstream flow relation to the at least one LNT. Additionally, a diesel particulate filter and/or selective catalyst reduction catalyst may be disposed in downstream flow relation to the at least one LNT. The reformer may include a reverse flow reactor operable to partially oxidize a fuel and a gaseous oxygen mixture, the fuel being delivered to the reverse flow reactor via a fuel injector. The fuel injector may be air assisted.

A method of exhaust aftertreatment for a lean burn internal combustion engine is also provided. The method includes providing at least one lean NOx trap (LNT) in downstream lean exhaust flow relation with the lean burn internal combustion engine and selectively directing substantially all of the lean exhaust flow to a first portion of the at least one LNT, while selectively blocking substantially all of the lean exhaust flow to a second portion of the at least one LNT. The method further includes introducing a mass flow rate of reductant to the second portion of the at least one LNT to regenerate the second portion of the at least one LNT.

The method may further include selectively blocking substantially all of the lean exhaust flow to the first portion of the at least one LNT when the first portion of the LNT traps a predetermined amount of NOx. Subsequently, substantially all of lean exhaust flow is selectively directed to the second portion of the at least one LNT when the second portion of the LNT is at least partially regenerated. Thereafter, a mass flow rate of reductant is introduced to the first portion of the at least one LNT to regenerate the first portion of the at least one LNT.

Additionally, the method may include introducing the mass flow rate of reductant to the first or second portion of the at least one LNT at quantities greater than required to regenerate the portion of the at least one LNT such that excess reductant passes through the second portion of the at least one LNT. Subsequently, the excess reductant and the lean exhaust gas is communicated to a diesel particulate filter (DPF) to effect regeneration of the DPF.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
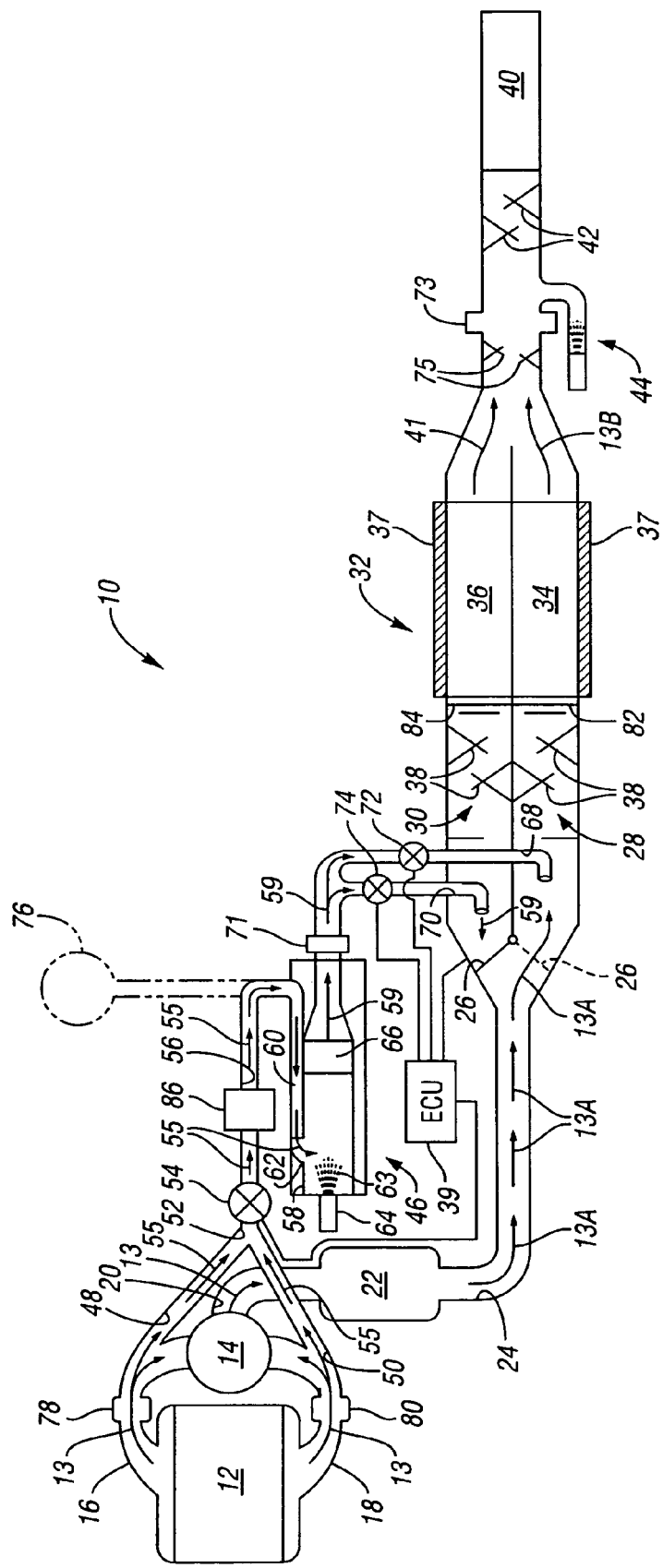
FIG. 1 is a schematic illustration of an exhaust aftertreatment system illustrating various aspects of the present invention.

Referring to the figures wherein like reference numbers represent like or similar components throughout the several views, there is shown in FIG. 1 an exhaust aftertreatment system 10 consistent with the present invention. A lean burn internal combustion engine 12 communicates products of combustion or exhaust gas 13 to a turbo charger 14 though a first and second exhaust manifold 16 and 18, respectively. The internal combustion engine 12 may be a compression ignited diesel engine or another type of lean burn engine known in the art. Upon exiting the turbocharger 14, the exhaust gas 13 passes through a passage 20 into a closely coupled diesel oxidation catalyst, or DOC 22, where hydrocarbon (HC) and carbon monoxide (CO) emissions are oxidized, nitric oxide (NO) is converted to nitrogen dioxide ($NO_2$), and some reduction of oxides of nitrogen (NOx) occurs, usually less than 20%. At the exit of the DOC 22, exhaust gas 13A is communicated to a passage 24 for subsequent communication with a bypass or diverter valve 26. Preferably, the DOC 22 is positioned in a close coupled relation to the turbocharger 14, however those skilled in the art will recognize that the DOC 22 may be placed further downstream, i.e. closer to the diverter valve 26, while remaining within the scope of that which is claimed. The diverter valve 26 selectively directs the exhaust gas 13A into either a first branch 28 or a second branch 30 of a lean NOx trap, or LNT 32. Accordingly, the diverter valve 26 selectively directs substantially all of the exhaust gas 13A into one of a first portion 34 and a second portion 36 of the LNT 32, via first and second branch 28 and 30, respectively, to absorb the NOx molecules within the exhaust gas 13A. With the diverter valve 26 positioned as shown in FIG. 1, the second portion 36 of the LNT 32 is provided with a reducing environment to allow regeneration, i.e. desorption and reduction of NOx, of the second portion 36 to occur in an environment with a low mass flow rate of oxygen.

In operation, the second portion 36 is held in the reducing environment until the first portion 34 of the LNT 32 reaches its NOx trapping capacity. At that time, the diverter valve 26 will switch to a position illustrated in FIG. 1 by dashed lines. Thereafter, the previously regenerated LNT portion, i.e. the second portion 36, will begin to trap NOx, while the fully loaded LNT portion, i.e. the first portion 34, is regenerated. When the lean burn internal combustion engine 12 is shut-off, the diverter valve 26 will preferably move to a position to ensure that at least a partially regenerated LNT portion 34 or 36 is available for NOx trapping upon engine restart. A heater 37 may electrically heat the LNT 32 to provide an amount of desulfation within the LNT 32. The first branch 28 and the second branch 30 may each have a plurality of baffles 38 disposed therein to effect mixing of exhaust gas 13A prior to entering the first portion 34 and the second portion 36 of the LNT 32. Those skilled in the art will recognize that additional branches may be employed in addition to the first branch 28 and the second branch 30, while remaining within the scope of that which is claimed. Additionally, the diverter valve 26 may have intermediate control operable to vary the amount of exhaust gas 13A through the portion, 34 or 36, of the LNT 32 being regenerated, thereby increasing the temperature of the LNT 32 to effect desulfation. In the preferred embodiment, an electronic control unit, or ECU 39 provides positional commands to the diverter valve 26. The ECU 39 preferably includes a preprogrammable digital computer operable to receive inputs from various engine and vehicular sensors, not shown, and act on the inputs to provide the appropriate positional command to the diverter valve 26. An NOx sensor/counter, not shown, or a calculated model for NOx accumulation, provided within the ECU 39, can be used to trigger the movement of the diverter valve 26 when a predetermined amount of NOx has accumulated within portion 34 or 36 of the LNT 32. Those skilled in the art will recognize a single stream LNT could be employed if portions of the single stream LNT are selectively blockable from the exhaust flow 13A to allow regeneration.

Upon exiting the LNT 32, the reducing gas 41 and the exhaust gas 13B converge and pass through a catalyzed diesel particulate filter, or DPF 40. The DPF 40 operates to filter particulate matter from within the exhaust gas 13B. Additionally, the DPF 40 assists the gaseous oxygen, contained within the exhaust gas 13B, in oxidizing excess reductant or reformate 59 contained within reducing gas 41 and hydrogen sulfide ($H_2S$) released during desulfation of the LNT 32. In an alternate embodiment, the DPF 40 may be a combined diesel oxidation catalyst/DPF. The DPF 40 is preferably placed downstream from the LNT 32 to allow faster heating of the LNT 32 by reducing the thermal mass upstream from the LNT 32 and to protect the LNT 32 from sintering as a result of the high temperatures created by the exothermic reactions as a result of the regeneration process of the DPF 40. Those skilled in the art will recognize that the DPF 40 may be placed upstream of the diverter valve 26 to protect the LNT 32 and the diverter valve 26 from particulates, and to eliminate the need for the DOC 22. However, precise control of the regeneration process of the DPF 40 is required to avoid runaway particulate oxidation temperatures that can damage the LNT 32. A plurality of baffles 42 are provided to aid in the mixing of reducing gas 41 and the exhaust gas 13B prior to entering the DPF 40. Additionally, a DPF regeneration fuel system 44 operates to provide hydrocarbon fuel for regeneration of the DPF 40.

Operating in conjunction with the LNT 32 is a side stream fuel reformer 46. A small fraction of the exhaust gas 13 is directed into side stream passages 48 and 50. The side stream passages 48 and 50, in the preferred embodiment, will be placed upstream of the turbo charger 14 at a point where the temperature and pressure of the exhaust gas 13 are high, thereby, minimizing the warm-up time of the reformer 46 and minimizing heavy fuel condensation. Those skilled in the art will recognize additional or fewer side stream passages may be used and the side stream passages, 48 and 50, may be located before or after the turbocharger 14.

A side stream passage collector 52 is in communication with a high temperature rated, variable rate valve 54, such as an exhaust gas recirculation (EGR) valve. The valve 54 is responsive to commands from the ECU 39 and operates to regulate or control the flow of side stream exhaust gas 55 to the side stream reformer 46 based upon a pressure drop versus temperature lookup table or other suitable method. In the preferred embodiment, the flow of the side stream exhaust gas 55 through the valve 54 will vary between 0% and 6% of the total flow of exhaust gas 13. This percentage will vary depending on the air-fuel ratio (A/F) and the NOx emission index of the engine 12. Upon exiting the valve 54, the side stream exhaust gas 55 will flow through a passage 56 and into the reformer 46. In the preferred embodiment, the reformer 46 contains a reverse flow reactor 58 operable to produce a reductant, such as partially oxidized (POx) gas or reformate 59. The reverse flow reactor 58 utilizes reaction exotherms to preheat incoming reactants within the side stream exhaust gas 55 using a heat exchanger 60. Even though the temperature of the exhaust gas 13 may be inconsistent, the reaction within the reformer 46 will proceed efficiently since the reverse flow heat exchanger 60 will act as an inlet temperature buffer that continuously warms the side stream exhaust gas 55 prior to entering the reverse flow reactor 58. Those skilled in the art will recognize that the reformer 46 may utilize other heat exchange systems while remaining within the scope of that which is claimed. These heat exchange systems may include a radiant air-to-air heat exchanger provided at the outlet of the reformer 46 and operable to transfer heat from the reformate 59 to the side stream exhaust gas 55. Additionally, those skilled in the art will recognize that a non-reverse flow reactor may be used in lieu of the reverse flow reactor 58 to enable faster light-off of the reformer 46 at cold engine startup.

The side stream exhaust gas 55 enters the reverse flow reactor 58 through a reactor inlet 62 where it is turbulently mixed with fuel 63 introduced by a fuel injector 64. The fuel injector 64 may be air assisted, which will reduce the percentage of side stream exhaust gas 55 required and increase the vaporization of the fuel 63. The fuel 63 and side stream exhaust gas 55 mix and are subsequently partially oxidized by a catalyst 66. Those skilled in the art will recognize that the reformer 46 may include a plasma device in lieu of the reverse flow reactor 58 and the catalyst 66. The reformate 59, upon exiting the reformer 46, is communicated to a first passage 68 and a second passage 70. Alternately, upon exiting the reformer 46, the reformate 59 may pass though a heat exchanger 71 to cool the reformate 59 and allow low water-gas shift catalysis for CO removal prior to introduction to one of the first passage 68 and the second passage 70. The first and second passages 68 and 70 is operable to distribute reformate 59 into the first branch 28 and the second branch 30, respectively.

With the diverter valve 26 in the position shown in FIG. 1, the exhaust gas 13 is directed into the first branch 28 allowing the first portion 34 of the LNT 32 to function, while the second branch 30 will have a low flow of exhaust gas 13 allowing the second portion 36 of the NOx absorber 32 to regenerate, as described hereinabove. Since the first branch 28, or the absorbing branch, has a much higher volumetric flow of exhaust gas 13, it has a higher upstream pressure than that of the second branch 30, or the regenerating branch. Thus, more reformate 59 will flow to the second branch 30, where there is a larger differential pressure from the exhaust side stream tapping point to the re-entry point. Any of the reformate 59 directed to the absorption branch will typically be combusted in the exhaust gas 13A. Therefore, it is desirable to direct a greater amount of reformate 59 to the regeneration branch, thereby reducing the amount of reformate 59 combusted and the amount of fuel 63 required for the regeneration of the LNT 32.

Accordingly, the reformate 59 may be introduced into the branches 28 and 30 in an orientation opposite that of the flow of exhaust gas 13A. The linear momentum of the exhaust gas 13A within the absorption branch, shown as first branch 28 in FIG. 1, will increase the pressure at the injection site of the reformate 59, thereby forcing much of the reformate 59 into the regeneration branch. Alternately, a first valve 72 and a second valve 74 may be provided in the first passage 68 and the second passage 70, respectively. The valves 72 and 74 are preferably controlled by the ECU 39 and operate to selectively communicate reformate 59 to one of the branches 28 and 30, respectively. Preferably, the valves 72 and 74 will switch simultaneously with the diverter valve 26 to ensure that the reformate 59 is directed only to the branch 28 or 30 which has a low flow of exhaust gas 13A, i.e. the regenerating branch. A three-way, high temperature rated valve, not shown, could be used at the outlet of the reformer 46 to both control the flow of the side stream exhaust gas 55 to the reformer 46, thereby replacing valve 54, and selectively direct the flow of reformate 59 to the desired branch 28 or 30 through the respective first and second passage 68 and 70.

During operation of the LNT 32, an amount of ammonia, or $NH_3$, may be produced. A selective catalyst reduction (SCR) catalyst 73 may be placed in downstream flow relation to the LNT 32 such that any ammonia produced during the operation of the LNT 32 may be utilized to assist in NOx conversion within the SCR catalyst 73. Additionally, the SCR catalyst 73 may assist in reducing ammonia tailpipe emissions at low engine operating temperatures. A plurality of baffles 75 may be provided to enhance mixing of the exhaust gas 13B and reducing gas 41, thereby increasing the effectiveness of the SCR catalyst 73.

Those skilled in the art will recognize that air may be used to partially oxidize the fuel 63 within the reformer 46. To accomplish this, an auxiliary air pump 76, shown in phantom, may be used to introduce air to the reformer 46 in lieu of side stream exhaust gas 55. Alternately, air from the air pump 76 and side stream exhaust gas 55 may be combined and introduced to the reformer 46.

Closely coupled, pre-turbo NOx absorbers 78 and 80 may be provided for cold start NOx absorption and subsequent high-temperature desorption. Additionally, a first DOC 82 and a second DOC 84 may be placed in front of the first portion 34 and the second portion 36, respectively, of the LNT 32. The DOCs 82 and 84 would catalyze the reformate oxidation to minimize sintering of the LNT 32.

A low power inline heater 86 may be provided upstream of the reformer 46 such as in the side stream passages 48 and 50, the side stream collector 52, or the passage 56, as shown in FIG. 1. Since only a small portion of the exhaust gas 13 is used to partially oxidize the fuel 63, the inline heater 86 may be effective to heat the side stream exhaust gas 55. The inline heater 86 will only function at cold start-up of the engine 12 since the heat exchanger 60 of the reformer 46 will preheat the incoming side stream exhaust 55 once the reaction within the reformer 46 is initiated.

The reformate 59 typically exits the reformer 46 at temperatures above 500° C. Therefore the reformate 59 will provide additional heat for desorption and reduction of NOx once the passage 56 warms. Additionally, a small leak (<0.5%) of exhaust gas 13A may be provided by the diverter valve 26 to generate heat by the oxidation/combustion of reformate 59 on the NOx absorber 32. The additional heat applied to the NOx absorber 32 may minimize CO inhibition and may help support desulfation. This may reduce the frequency of fuel dependent desulfation events that can reduce the conversion efficiency of the LNT 32.

Figure 2:
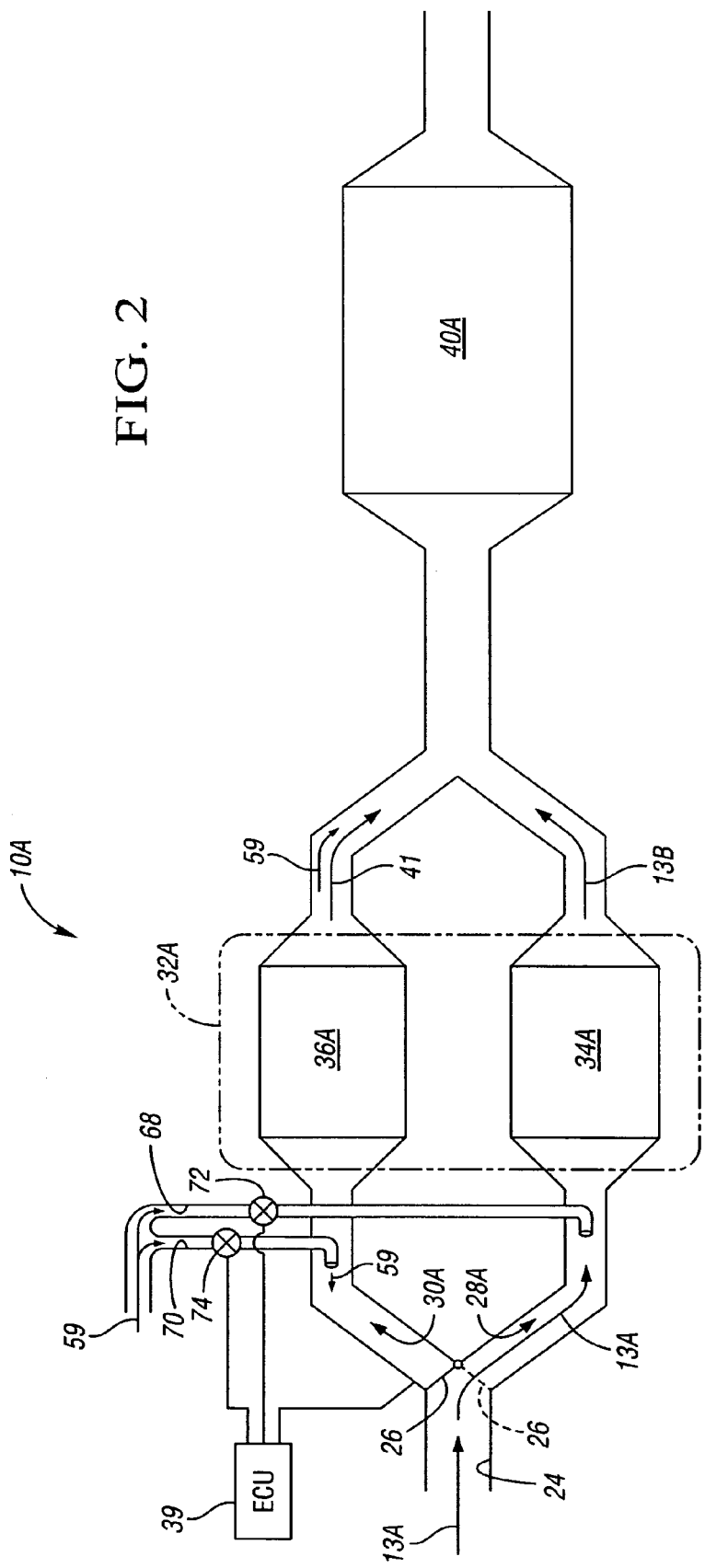
FIG. 2 is a schematic illustration of an alternative embodiment of the exhaust-aftertreatment system of FIG. 1.

Referring to FIG. 2, there is shown a schematic illustration of an alternate embodiment of the exhaust aftertreatment system 10, generally indicated at 10A. The exhaust aftertreatment system 10A is capable of regenerating DPF 40A without the DPF regeneration fuel system 44, shown in FIG. 1. The exhaust aftertreatment system 10A includes an LNT 32A having a first portion 34A spaced from a second portion 36A. First and second branches 28A and 30A are disposed in a generally Y-shaped configuration and communicate with the respective first and second portions 34A and 36A. The diverter valve 26 selectively directs the exhaust gas 13A within the passage 24 to one of the first branch 28A and second branch 30A. In an operation similar to that discussed with reference to FIG. 1, the diverter valve 26, in the position shown in FIG. 2, will direct exhaust gas 13A to the first portion 34A of the LNT 32A to enable absorption of NOx within the exhaust gas 13A. Additionally, the exhaust gas 13A is blocked from entering the second branch 30A such that the second portion 36A of the LNT 32A is held in a reducing environment to allow regeneration of the second portion 36A. The first and second passages 68 and 70 are configured to selectively provide a high mass flow rate of reformate 59 to a respective one of the first branch 28A and the second branch 30A. The mass flow rate of reformate 59 may be on the order of approximately ten times greater than needed to regenerate the second portion 36A of the LNT 32A. The Y-shaped configuration of the first and second branch 28A and 30A is beneficial in that the injection point of reformate 59 will be sufficiently distant from the diverter valve 26 to avoid the possibility of interaction between the lean or oxygen rich exhaust gas 13A and the reformate 59 resulting to high reaction exotherms that could possibly damage the diverter valve 26 or the LNT 32A.

By introducing a greater amount of reformate 59 than is required to regenerate the portions 34A or 36A of the LNT 32A, the excess reformate 59 will pass through the portion 34A or 36A to mix with the exhaust gas 13B downstream of the LNT 32A. This mixing of the exhaust gas 13B and reformate 59 will enable burning of the reformate 59 within the DPF 40A. The heat generated by burning the reformate 59 within the DPF 40A enables burning of the particulate matter trapped therein. The reformate 59 may be provided by the reformer 46 or other devices such as a plasma reformer, gas cylinder, etc.

The present invention obviates the need for engine cycling to regenerate the LNT 32. By diverting the oxygen rich exhaust gas 13A away from a portion of the LNT 32 during regeneration, the need for throttled engine cycling to reduce the mass flow rate of oxygen is negated. The exhaust gas 13 is preferably as lean as possible to reduce the percentage of side stream exhaust gas 55 required by the reformer 46. This is beneficial at low engine loads, since the low exhaust backpressure may not provide the necessary pressure differential to communicate a large mass flow rate of side stream exhaust gas 55 into the side stream passages 16 and 18. The present invention will also dispense with the controls and control strategy required to implement engine cycling.

By employing a diverter valve 26 upstream of the LNT 32, the amount of reductant or reformate 59 required for regeneration of the LNT 32 is minimal. Therefore, the amount of fuel 63 required to create the reformate 59 is minimized. Since the reformate production reaction is continuous, the hydrogen yield can be maximized so that less fuel 63 is required to produce the same mass of hydrogen.

While the best modes for carrying out the invention have been described in detail, those familiar with the art to which this invention relates will recognize various alternative designs and embodiments for practicing the invention within the scope of the appended claims.

The invention claimed is:

1. A method of exhaust aftertreatment for a lean burn internal combustion engine comprising:
   providing at least one lean NOx trap (LNT) in downstream lean exhaust flow relation with the lean burn internal combustion engine;
   providing a diesel oxidation catalyst in fluid communication with said at least one LNT such that said diesel oxidation catalyst is upstream of said at least one LNT;
   selectively directing substantially all of said lean exhaust flow to a first portion of said at least one LNT;
   selectively blocking substantially all of said lean exhaust flow to a second portion of said at least one LNT;
   introducing a mass flow rate of reductant to said second portion of said at least one LNT to regenerate said second portion of said at least one LNT; and
   combining exhaust flow from said first portion of said at least one LNT and exhaust flow from said second portion of said at least one LNT upstream of a diesel particulate filter disposed in a downstream flow relation to said at least one LNT;
   introducing said mass flow rate of reductant to said second portion of said at least one LNT at quantities greater than required to regenerate said second portion of said at least one LNT such that excess reductant passes through said second portion of said at least one LNT; and
   communicating said excess reductant and said lean exhaust gas to said diesel particulate filter (DPF) to effect regeneration of said DPF.

2. The method of claim 1, further comprising:
   selectively blocking substantially all of said lean exhaust flow to said first portion of said at least one LNT when said first portion of said LNT traps a predetermined amount of NOx; and
   selectively directing substantially all of lean exhaust flow to said second portion of said at least one LNT when said second portion of said LNT is at least partially regenerated.

3. The method of claim 2, further comprising:
   introducing a mass flow rate of reductant to said first portion of said at least one LNT to regenerate said first portion of said at least one LNT.

4. The method of claim 3, further comprising:
   introducing said mass flow rate of reductant to said first portion of said at least one LNT at quantities greater than required to regenerate said first portion of said at least one LNT such that excess reductant passes through said first portion of said at least one LNT; and
   communicating said excess reductant and said lean exhaust gas to said diesel particulate filter (DPF) to effect regeneration of said DPF.

* * * * *